United States Patent Office 3,677,701
Patented July 18, 1972

3,677,701
SULFURIC ACID DEFLUORINATION
Clinton A. Hollingsworth, 2010 Reaney Road; and John Harold Snyder, 546 Carole St., both of Lakeland, Fla. 33803; and Ernest Andrew Gudath, 413 S. Bryan Circle, Brandon, Fla. 33511
No Drawing. Filed June 1, 1970, Ser. No. 41,648
Int. Cl. C01b 17/90, 9/08
U.S. Cl. 23—172        9 Claims

ABSTRACT OF THE DISCLOSURE

Concentration of fluorine compounds in spent sulfuric acid can be reduced by at least 96% by mixing the acid with diatomaceous earth in excess of the stoichiometric amount.

---

This invention relates to defluorination of spent sulfuric acid by the use of diatomaceous earth.

Sulfuric acid and oleum find important use in the manufacture of many organic compounds. Often, as in the case of nitration processes, the sulfuric acid serves as a dehydrating agent and does not become incorporated in the final product to any extent. Thus, there is recovered from such processes a stream of sulfuric acid which has become contaminated with water, other acids such as nitric and hydrofluoric acids, as well as quantities of the organic product and products of side reactions. Such sulfuric acid is often referred to as spent sulfuric acid and its reprocessing forms a small but significant segment of the sulfuric acid industry.

A particularly objectionable impurity in spent sulfuric acid is fluorine. When the word fluorine is used herein, it will be understood that the term refers to the fluorine content of hydrofluoric acid, or other fluorides, fluosilicates, organic fluorides, etc. Reference to elemental fluorine ($F_2$) is not intended. Hydrofluoric acid is quite soluble in sulfuric acid and is difficult to remove by conventional means. Certain organic fluorides are also difficult to remove from sulfuric acid. Removal in a stripping tower or the like is possible but it is far from satisfactory because removal is incomplete and the fluorine removed is in the form of HF which causes serious corrosive problems in the removal system. Thus, if it is desired to remove nitric acid from a spent acid containing sulfuric acid, nitric acid, and hydrofluoric acid by stripping in a tower, most of the nitric acid would readily be removed but the tower may be damaged by the corrosive action of the HF vapors.

It is, therefore, an object of this invention to provide a method for removing fluorine from fluorine-containing spent sulfuric acid by the use of diatomaceous earth.

Another object of this invention is the provision of a method for the removal of fluorine from fluorine-containing sulfuric acid in a manner attended by less corrosion than formerly.

Still another object of the invention is the provision of a method to effect the removal of fluorine from fluorine-containing sulfuric acid such that the fluorine values may advantageously be recovered in the form of fluosilicic acid.

Additional objects, if not specifically set forth herein, will be readily apparent to those skilled in the art from the detailed description which follows.

With respect to the acid to be treated in accordance with the process described herein, any sulfuric acid which contains an excess of hydrofluoric acid, organic fluorides, or other fluorides may be subjected to the defluorinating process. Especially suitable for defluorination is spent sulfuric acid derived from the nitration, in the presence of sulfuric acid, of fluorine-containing aromatics such as the manufacture of N,N-dipropyl-2,6-dinitro-4-trifluoromethylaniline, also known as Treflan (British patent 917,235). The spent sulfuric acid from this operation contains typically and approximately:

| | Percent |
|---|---|
| $H_2SO_4$ | 90 |
| $HNO_3$ | 5 |
| Organic solids | 1 |
| F | 0.3 |

The organic solids contain 3,5-dinitro-4-chlorobenzotrifluoride, and 3,5-dinitro-4-chlorobenzoic acid, in approximately equal proportions.

It has been the practice to remove impurities from the spent sulfuric acid in a stripping tower which is operated under a partial vacuum and to which is added heat and a certain amount of water to accomplish the stripping. The more volatile constituents, i.e., nitric acid, hydrofluoric acid, and some of the water vapor, leave the tower at the top and the purified sulfuric acid, diluted to approximately 65–68% $H_2SO_4$, leaves at the bottom.

The problems is reclaiming sulfuric acid from spent sulfuric acid are twofold.

(1) fluorine that is vacuum stripped from mixed spent sulfuric acid is in the form of hydrofluoric acid which causes serious corrosion of the stripping tower and related equipment; and (2) the tower bottoms, i.e., purified sulfuric acid, still contains excessive levels of fluorine for applications such as steel pickling which require a fluorine content of below about 80 p.pm., and preferably below 30 p.p.m.

The fluorine content in the spent sulfuric acid may vary anywhere from 0.1% to 0.5% on weight basis. By the process of this invention, it is possible to remove up to 95% to 99% of the fluorine in the acid.

Reduction of the fluorine content in spent sulfuric acid to the desired level has been accomplished by adding diatomaceous earth to the acid in about the stoichiometric amount. Apparently, fluorinated hydrocarbons in sulfuric acid decomposed in presence of the diatomaceous earth to hydrofluoric acid which reacts with diatomaceous earth in accordance with the following reaction.

$$4HF + SiO_2 \rightarrow SiF_4\uparrow + 2H_2O$$

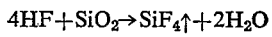

As is evident from the equation, only one mole of diatomaceous earth in the form of silicon dioxide is required to react with 4 moles of hydrofluoric acid to form one mole of silicon tetrafluoride, which escapes as gas, and 2 moles of water. Although slightly above the stoichiometric amount can be used, defluorination of spent sulfuric acid can be effected by addition of from 0.01% to 6%, and preferably from 0.1% to 3% of diatomaceous earth. By stoichiometric amount we mean an amount of diatomaceous earth which contains the stoichiometric quantity of silica sufficient to react with the fluorine compounds in the spent sulfuric acid. It should be apparent that more than 6% of diatomaceous earth can be used, however, a large excess would only complicate matters since the unrecated diatomaceous earth must be removed from the acid. If the particle size of diatomaceous earth is very fine, a filter aid would be required to filter it out.

Although the spent acid may be agitated to disperse the diatomaceous earth therethrough, experiments with air-agitation have shown that this is not necessary. All that is required is to contact diatomaceous earth with spent sulfuric acid. This may be accomplished by affixing diatomaceous earth on a grid and passing spent sulfuric acid therethrough, or by adding diatomaceous earth to spent sulfuric acid held in a tank. When it is desired to disperse diatomaceous earth in spent sulfuric acid by means of agitation, the agitation period may vary from 30 seconds to 3 hours or more, and preferably at least 5 minutes to 90 minutes. Longer mixing periods, though not detrimental, are not required to achieve defluorination, as already noted.

The defluorination process of spent sulfuric acid is carried out at room temperature. Though defluorination is somewhat hastened at elevated temperatures, it is not necessary to heat spent sulfuric acid since heating costs may or may not be justified.

When mixing of the spent sulfuric acid is stopped, excess diatomaceous earth floats to the surface and is collected for re-use. After the acid has been agitated for a sufficient period of time to effect defluorination thereof, unreacted diatomaceous earth is recovered from the acid by known filtration methods. In this manner, most of the diatomaceous earth is recovered while the remainder is either solubilized, lost as silicon tetrafluoride or suspended in colloidal form which passes through the filter.

In order to reduce fluorine content of spent sulfuric acid, which has been treated with diatomaceous earth, to below 30 p.p.m. so that it could be used in pickling steel, the spent acid may be filtered to remove diatomaceous earth prior to introduction into the conventional stripping tower where additional fluorine is removed from the acid by vacuum distillation. Since the bulk of fluorine has been previously removed, the corrosion of the tower and related equipment is substantially reduced.

The process described above relates to reduction of fluorine content in spent sulfuric acid. The fluorine may be in the form of hydrofluoric acid, 3,5-dinitro-4-chlorobenzotrifluoride or in any other form which reacts with diatomaceous eath and can be subsequently removed as a gas, as in the case of silicon tetrafluoride, or as a solid which can be removed with the filter cake.

Diatomaceous earth is a light-colored, light-weight, friable sedimentary rock composed of the siliceous shells of microscopic aquatic plants called diatoms. Diatomaceous earth may range from yellowish tan to brown, but commonly it is so light in color that quarry faces appear brilliant white. The material is soft, finely granular, and more or less chalky. Superficially, it may resemble pumicite or tripoli but use of the hand lens or microscope will readily distinguish diatom tests from shards of volcanic glass or finely divided residual silica. Porosity may be 75% or even more. The pore space of the mineral as mined is partly or wholly filled with mechanically held water, the amount depending on the rainfall in the area of the deposit. Commercial grades of diatomaceous earth have the following range of chemical composition:

| | Percent |
|---|---|
| $SiO_2$ | 85–92 |
| $Al_2O_3$ | 4–10 |
| $Fe_2O_3$ | 0.8–2.0 |
| CaO | 0.1–2.0 |
| MgO | 0.1–2.0 |
| Alkalies | 0.2–1.5 |
| Loss on ignition | 5–8 |
| Organic matter | 0–3 |

The alumina comes from a small amount of clay. The loss on ignition is mostly combiend water in the opaline silica of the diatom tests.

Diatomaceous earth is generally used in powdered form, either natural or calcined. Calcination shrinks and hardens the particles, and sinters some of them into microscopic clusters. Care is taken in milling to preserve the particles' irregular shapes, spiny extensions and intricately pitted surface. The use of uncalcined diatomaceous earth is preferred in the present invention for economic reasons. Calcined diatomaceous earth is much more expensive and it is used primarily as a filter aid.

Although the true specific gravity or density of opaline silica is 2.0 to 2.3, diatomaceous earth powder packs so loosely that its apparent density may be as low as 0.62, or 10 pounds per cubic foot. More than 90 percent of the apparent volume of the powder consists of microscopic interconnected voids. The powder will absorb three times its own weight of liquid before becoming saturated, and its specific area is enormous. Only 210 grams of diatomaceous earth powder, less than one-half pound, has a surface area of 45,000 square feet, which about equals the area of a football field.

Diatomaceous earth is insoluble in most chemical reagents. It is moderately refractory, having a softening point of 1400° to 1600° C. Both block and powdered diatomaceous earth have a very low thermal conductivity. Loose powder, weighing 16 pounds per cubic foot, has a $k$ factor of only 0.73. The true hardness of individual particles is 4.5 to 6.5. The thin-walled, cellular structure of the particles allows them to collapse under pressure and gives the powder a mild abrasive property.

An example of commercially available diatomaceous earth is Kenite$^T$. The average analysis of uncalcined Kenite$^T$ on dry basis is as follows:

| | Percent |
|---|---|
| Silica ($SiO_2$) | 92.3 |
| Alumina ($Al_2O_3$) | 1.1 |
| Iron oxide ($Fe_2O_3$) | 2.0 |
| Lime (CaO) | 0.9 |
| Magnesia (MgO) | 0.4 |
| Ignition loss (combined $H_2O$, $CO_2$ and organics) | 3.1 |

Charateristics of Kenite$^T$ diatomaceous earth are given below:

appearance—uniform, fluffy powder
particle shape—predominantly disc, elongated and spicule
bulking value—greater bulk per unit weight, dry or wet
adsorption—minute
dispersion—wets and disperses readily and quickly, with liquid capacity exceptionally high
suspension—excellent
reactivity—inert, except with respect to HF
porosity—high, 60–85%
refractive index—1.45 to 1.49
pH range—6.0 to 9.0, depending upon grade
soluble material—acid and water solubles very low
fire resistance—melting point about 3000° F., high combustion resistance
average particle size—0.1 to 10 microns, depending on grade The following examples illustrate the process for reducing fluorine ontent of spent sulfuric acid.

EXAMPLE I

In this example, various amounts of Kenite$^T$ diatomaceous earth were added to spent sulfuric acid which was purified in a stripping tower prior to its fortification with virgin sulfuric acid. The acid was periodically stirred for a period of 3 hours and then vacuum filtered through an asbestos pad.

As received, this purified acid contained approximately 66% $H_2SO_4$, 0.016% F and no $HNO_3$. Following its filtration through an asbestos pad, its fluorine content dropped to 0.012%, indicating that some of the fluorine was retained by the filter cake. Results are tabulated below.

TABLE 1

| Sample Number | Kenite $^T$ added, weight percent | Percent $F_2$ in filtered acid | Percent $F_2$ removed from acid |
|---|---|---|---|
| 1 | 0.0 | 0.012 | 25 |
| 2 | 0.01 | 0.010 | 37 |
| 3 | 0.1 | 0.009 | 44 |
| 4 | 0.5 | 0.006 | 62 |
| 5 | 1.0 | 0.003 | 81 |

As results indicate, addition of 1% of Kenite$^T$ diatomaceous earth to the acid was effective in removing over 80% of the fluorine.

EXAMPLE II

A defluorination test was made on a sample of spent sulfuric acid to determine the degree of defluorination. Spent sulfuric acid is a mixture of sulfuric acid, nitric acid, hydrofluoric acid, fluorocarbons, etc. One percent of Kenite$^T$ diatomaceous earth, based on the weight of acid, was added to the mixed spent sulfuric acid and the mixture was repeatedly stirred for about 30 minutes. Stirring of the mixture caused the unreacted diatomaceous earth to float to the surface. Upon vacuum filtration of the mixture through an asbestos pad, a large percentake of the unreacted diatomaceous earth was recovered. Apparently, the remainder of the diatomaceous earth went into solution and/or was lost as $SiF_4$ to the atmosphere. Results are given below.

TABLE 2

| | Wt. percent $F_2$ | F distr., percent |
|---|---|---|
| Spent $H_2SO_4$ | 0.24 | |
| Treated $H_2SO_4$ | 0.024 | 11 |
| Filtered solids | 1.0 | 3 |
| Unaccounted for | | 86 |

From the above table, it is evident that 1% of diatomaceous earth removed about 90% of the fluorine. The same test made on a different date indicated removal of 95% of fluorine. 86% of the fluorine is shown to be unaccounted for and is believed to have been lost to the atmosphere.

EXAMPLE III

In this example, a number of defluorination tests were conducted with varying amounts of Kenite$^T$ diatomaceous earth. In each instance, the diatomaceous earth was added to a spent acid in the amount indicated, the mixture was stirred for about 2 hours and vacuum filtered through an asbestos pad. Results are tabulated below, in weight percent.

TABLE 3

| Test Number | Percent Kenite$^T$ added | Percent $F_2$ in sample | Percent $F_2$ removed |
|---|---|---|---|
| Mixed spent $H_2SO_4$ | | 0.20 | |
| 1 | 0.01 | 0.074 | 13 |
| 2 | 0.1 | 0.057 | 71 |
| 3 | 0.5 | 0.018 | 69 |
| 4 | 0.5, and 0.5% NaOH | 0.036 | 82 |
| 5 | 1.0 | 0.010 | 95 |

Above results point out that the amount of fluorine removed from the mixed spent acid bears a direct proportion to the amount of Kenite$^T$ diatomaceous earth added. Addition of 1% of diatomaceous earth to the mixed spent acid was effective is removing 95% of the fluorine. It seems that sodium hydroxide, in conjunction with diatomaceous earth, is detrimental to defluorination.

EXAMPLE IV

Samples of mixed spent sulfuric acid were mixed with sand and Kenite$^T$ diatomaceous earth to determine degree of defluorination and filtration rates. Sand and Kenite$^T$ were added to the acid and stirred periodically for 2 hours and then allowed to stand for 1 hour prior to filtration. The samples were vacuum filtered through a 3-inch Buchner funnel using a coarse polypropylene Polymox B Style 222.003.00 filter cloth.

Unreacted Kenite$^T$, for the most part, floated and care was taken to decant the acid minus Kenite$^T$ so as to avoid clogging the filter. Two standards were analyzed for fluorine—one was filtered prior to the analysis and the other one was analyzed unfiltered. Results of the tests conducted at room temperature are given below.

TABLE 4

| Samples | Wt. percent $F_2$ | Percent F removed | Filtration rate, gals./hr./ft. of filter |
|---|---|---|---|
| 1% Kenite$^T$ added | 0.045 | 81 | 7 |
| 0.5% Kenite$^T$ added | 0.057 | 76 | 9 |
| 0.25% Kenite$^T$ added | 0.076 | 68 | 12 |
| 5% quartz sand added | 0.202 | 14 | 108 |
| Standard, filtered | 0.236 | | 108 |
| Standard, unfiltered | 0.217 | | |

Above results dramatically point out the ineffectiveness of quartz sand as defluorination agent. Whereas 1% of Kenite$^T$ was effective in removing 81% of fluorine, 5% of quartz sand removed only 14% of fluorine. Basis for calculating percent of fluorine removed was 0.236.

EXAMPLE V

In this example, effects of air agitation, Kenite$^T$ and sodium metasilicate were determined on defluorination of mixed spent sulfuric acid. Air agitation involved bubbling air through the acid samples for about 2 hours; stirring was periodic over a 2-hour span. The samples were allowed to stand undisturbed for 1 hour prior to vacuum filtration through a Polymox B polypropylene filter cloth. Results are tabulated below.

TABLE 5

| Samples | Percent F | Percent $F_2$ removed |
|---|---|---|
| 1% Kenite$^T$ added, sample stirred | 0.02 | 87 |
| 1% Kenite$^T$ added, sample air agitated | 0.04 | 73 |
| 1% sodium metasilicate added, sample stirred | 0.13 | 13 |
| Standard, air agitated, filtered | 0.15 | |
| Standard, air agitated, not filtered | 0.15 | |

As is evident from above table, sodium metasilicate is ineffective in removing fluorine from spent sulfuric acid.

EXAMPLE VI

Kenite$^T$ diatomaceous earth, Pearlite$^T$ diatomaceous earth and amorphous sand were added to mixed spent sulfuric acid at levels of 0.5 and 0.1 weight percent and stirred periodically over a 2-hour period. Part of the acid was filtered and both filtered and unfiltered acids were analyzed for fluorine to determine if significant amount of fluorine was tied up with unreacted solids.

TABLE 6

| | Wt. percent fluorine | |
|---|---|---|
| | Filtered | Unfiltered |
| Standard | 0.195 | 0.170 |
| 0.5% Kenite$^T$ | 0.045 | 0.049 |
| 0.1% Kenite$^T$ | 0.096 | 0.097 |
| 0.5% Pearlite$^T$ | 0.027 | 0.029 |
| 0.1% Pearlite$^T$ | 0.112 | 0.101 |
| 0.5% amorphous silica | 0.148 | 0.159 |
| 0.1% amorphous silica | 0.164 | 0.149 |

Above results confirm the fact that amorphous silica is ineffective in defluorinating spent sulfuric acid. Between the two types of diatomaceous earths, Pearlite$^T$ has shown better results at 0.5% level.

EXAMPLE VII

Identical set of samples were prepared with indicated amounts of defluorinated agents. These samples were vacuum bioled for a period of 1 hour at a vacuum of 15–20" Hg, to simulate conditions in the denitrification process. Results are tabulated below.

TABLE 7

|  | Wt. percent fluorine | |
|---|---|---|
|  | Unfiltered | Filtered |
| Standard | 0.052 | 0.049 |
| 0.5% Kenite | 0.021 | 0.019 |
| 0.1% Kenite | *0.057 | 0.029 |
| 0.5% Pearlite | 0.019 | 0.023 |
| 0.1% Pearlite | 0.018 | 0.022 |

*Probably contaminated by trap water.

It is noteworthy that boiling alone reduced fluorine concentrations in about half.

EXAMPLE VIII

A tank 10 feet 7 inches in diameter by 31 feet high was set up with a recirculating pump discharging to a cone mixer on top of the tank to facilitate mixing and dispersion of solids into the contents of the tank. Air sparges were also installed through the sides of the tank near the bottom for additional mixing with compressed air. The tank was then filled with 130 tons of spent acid allowing for approximately 6 feet of freeboard. Diatomaceous earth was added at the cone mixer at the rate of 10 pounds per ton of acid. Evolution of copious fumes was observed being discharged from the tank to a suitable fume collection system. After about 24 hours of mixing by recirculation and air agitation, the acid was fed to the stripping tower. No problems were reported in connection with this operation. Fumes were reported to be less around the stripping tower than previously with untreated spent acid. Table 8 shows analytical results of this test.

TABLE 8

|  | F | Si | $NO_3$ | $SO_4$ |
|---|---|---|---|---|
| Raw spent acid unprocessed | 0.207 | 0.00 | 3.62 | 89.37 |
| Raw spent acid after addition of Pearlite | 0.019 | 0.09 | 3.05 | 88.53 |
| Sample of denitrated product | 0.0073 | 0.07 | 0.00 | 63.48 |

We claim:
1. A prcoess for reducing concentration of fluorine compounds in sulfuric acid comprising contacting sulfuric acid containing the fluorine compounds with diatomaceous earth in excess of the stoichiometric amount required to react with the fluorine compounds to form and evolve gaseous fluoride-containing products therefrom.

2. Process of claim 1 wherein amount of the diatomaceous earth added to the acid is in the range of 0.01% to 6%, based on the weight of the acid, the process including the step of separating the remaining diatomaceous earth from the acid.

3. Process of claim 2 including the step of agitating the acid for a period of from 30 seconds to 3 hours to disperse the diatomaceous earth therethrough.

4. Process of claim 3 wherein amount of the diatomaceous earth added to the acid is in the range of 0.1% to 3%.

5. Process of claim 2 wherein said step of contacting includes adding the diatomaceous earth to the acid and agitating the acid for a period of 5 to 90 minutes to disperse the diatomaceous earth therethrough.

6. Process of claim 2 wherein said step of separating includes filtering through a suitable filter.

7. Process of claim 2 including the step of boiling the acid containing the diatomaceous earth.

8. Process of claim 2 including the step of boiling the acid containing the diatomaceous earth under vacuum.

9. Process for reducing content of fluorine compounds in sulfuric acid consisting essentially of contacting sulfuric acid containing the fluorine compounds with an effective quantity of diatomaceous earth to reduce the content of the fluorine compounds by at least 90% by the formation and evolution of gaseous fluoride-containing products from said acid.

References Cited

UNITED STATES PATENTS

| 2,535,036 | 12/1950 | Broughton | 23—153 X |
| 2,886,414 | 5/1959 | Secord | 23—205 X |
| 2,987,376 | 6/1961 | Gloss | 23—205 X |
| 2,992,070 | 7/1961 | Henley | 23—173 |
| 3,273,963 | 9/1966 | Gunn, Jr. | 23—205 X |
| 3,326,634 | 6/1967 | Porter et al. | 23—153 |
| 3,087,787 | 4/1963 | Flemmert | 23—153 |

OSCAR R. VERTIZ, Primary Examiner

C. B. RODMAN, Assistant Examiner

U.S. Cl. X.R.

23—88, 153

UNITED STATES PATENT OFFICE
CERTIFICATE OF CORRECTION

Patent No. 3,677,701     Dated July 18, 1972

Inventor(s)    Clinton A. Hollingsworth et al.

It is certified that error appears in the above-identified patent and that said Letters Patent are hereby corrected as shown below:

Column 5, in Table 3, lines 48 and 51, under column designated "Percent $F^2$ Removed", the first number "13" should read -- 63 --; and the third number "69" should read -- 91 --. Column 6, line 75, "bioled" should read -- boiled --.

Signed and sealed this 2nd day of January 1973.

(SEAL)
Attest:

EDWARD M. FLETCHER, JR.            ROBERT GOTTSCHALK
Attesting Officer                   Commissioner of Patents